United States Patent [19]

Jorgenson et al.

[11] 3,934,118

[45] Jan. 20, 1976

[54] VARIABLE WATTAGE KETTLE

[76] Inventors: Morris E. Jorgenson, 67 Bythia St., Orangeville, Ontario; Paul B. Sheldon, 48 Tupper St., Brockville, Ontario; Jack A. Sherman, 23 Forest Park; Peter S. Wardell, 63 Rustic Crescent, both of Orangeville, Ontario, all of Canada

[22] Filed: June 27, 1974

[21] Appl. No.: 483,892

[52] U.S. Cl. ................. 219/442; 99/281; 99/333; 219/437
[51] Int. Cl.² ............................................ F27D 11/02
[58] Field of Search .......... 219/429, 430, 435, 436, 219/437, 438, 439, 441, 442, 506; 99/281, 333, 340, 440

[56] References Cited
UNITED STATES PATENTS

| | | | |
|---|---|---|---|
| 1,318,168 | 10/1919 | Newsom | 219/441 |
| 2,244,580 | 6/1941 | Smith | 219/442 |
| 2,847,554 | 8/1958 | Huffman | 219/442 |
| 2,896,062 | 7/1959 | Kueser | 219/441 |
| 2,924,698 | 2/1960 | Japson | 219/441 |
| 2,931,884 | 4/1960 | Jepson et al. | 219/442 X |
| 3,135,860 | 6/1964 | Czarnecki | 219/441 |
| 3,143,639 | 8/1964 | Wickenberg et al. | 219/442 |
| 3,425,336 | 2/1969 | Bufkin | 99/281 |
| 3,508,485 | 4/1970 | Munsey | 219/442 X |
| 3,549,861 | 12/1970 | Trachtenberg et al. | 219/441 |
| 3,577,908 | 5/1971 | Burg | 99/333 |
| 3,715,567 | 2/1973 | Mandziak | 219/437 |
| 3,781,521 | 12/1973 | Kircher | 219/442 |

*Primary Examiner*—Volodymyr Y. Mayewky
*Attorney, Agent, or Firm*—R. H. Fox; E. H. Oldham

[57] ABSTRACT

This invention relates to an improvement in electric kettles and in particular to the temperature controls for such kettles. The temperature control is adjustable to provide a variation in operating temperature of the heating element of the kettle and thus control the wattage input to the kettle. By this means it is possible to control the rate at which water is boiled or evaporated from the kettle. By setting the temperature control to its highest heat position, full wattage is supplied to the heater element to bring the water in the vessel to a boil and vapourize the contents thereof in the shortest possible time. If the temperature controller is left in the high heat position the kettle will evaporate at an approximate rate of two quarts of water in one hour. If the control is set to the low end of the range the contents will be brought up to a boil condition in the same time as if the thermostat were set on the high heat position, but the same amount of water will be evaporated in 12 to 15 hours. No matter which setting is used the temperature control is effective to protect the kettle during a "boil dry" overheat cycle.

1 Claim, 3 Drawing Figures

U.S. Patent  Jan. 20, 1976  3,934,118
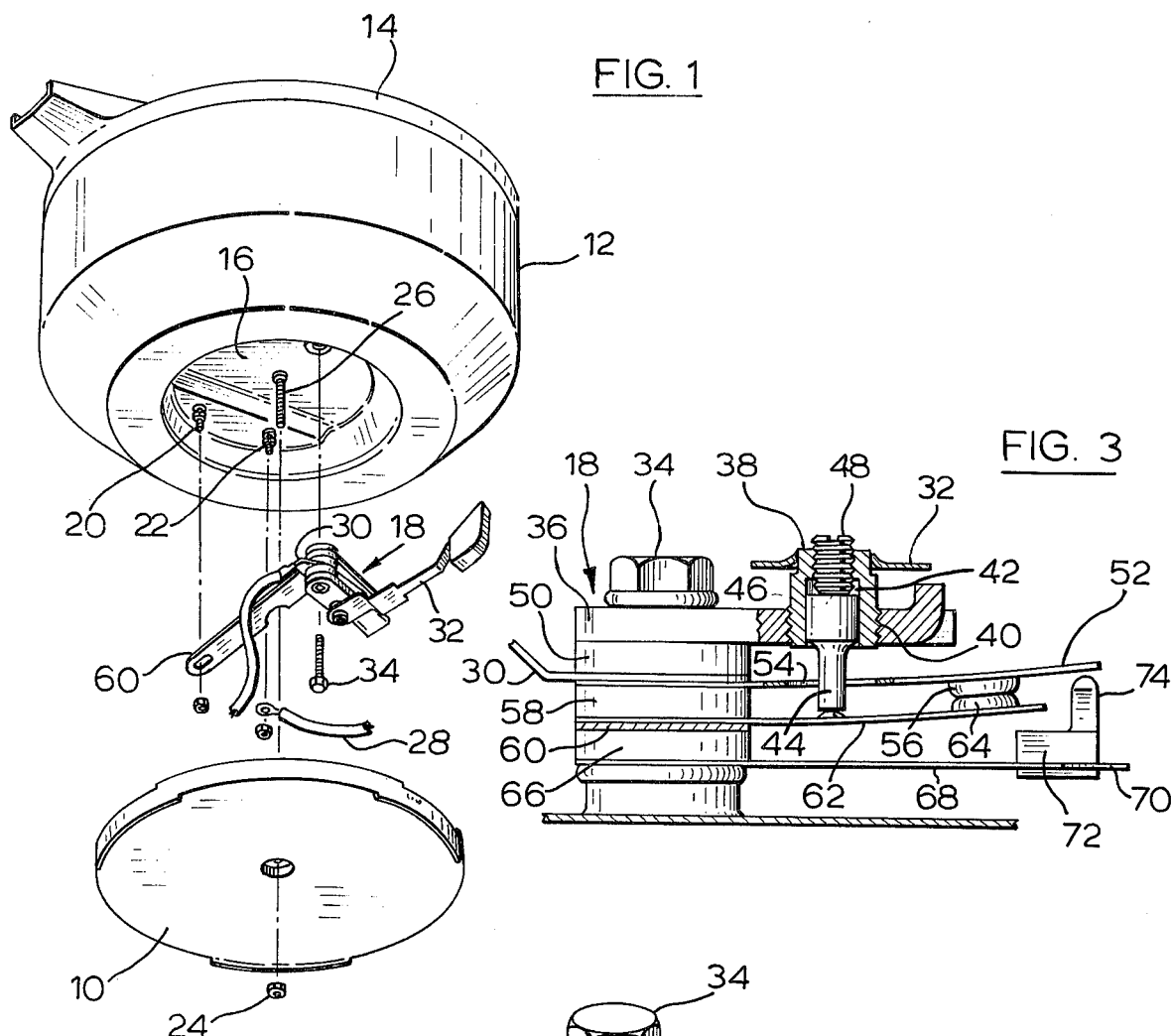
FIG. 1
FIG. 3
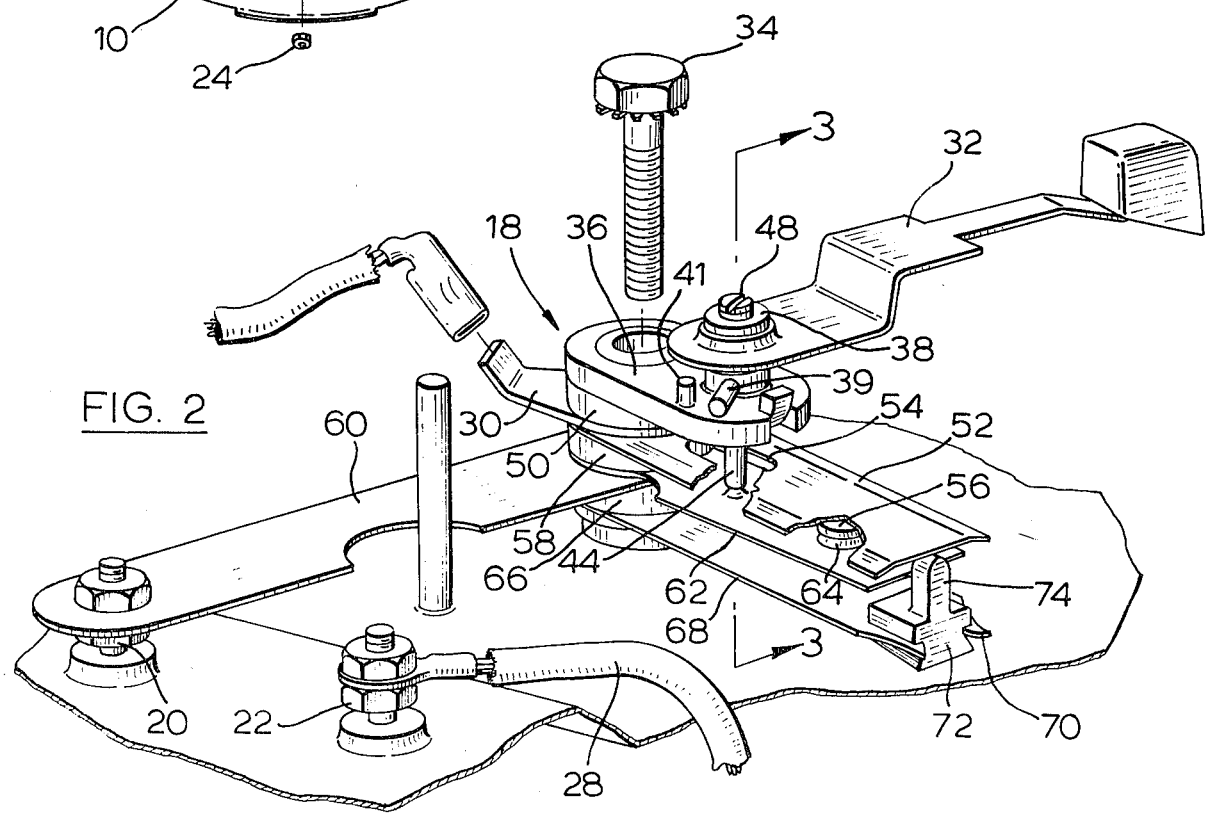
FIG. 2

VARIABLE WATTAGE KETTLE

BACKGROUND OF THE INVENTION

Vessels such as water kettles have been heating water for mankind for some time and the electric kettle has probably been the last link to evolve in the kettle chain of development. The first electric kettles were provided with a simple sheath covered electric heating element located in the bottom of the vessel which heated the water by heat transfer through the sheath into the water. A thermostat of the "reset" type was usually provided to protect the kettle against resulting damage during "boil dry."

Subsequently kettles evolved which could heat the water in the vessel at two substantially different rates. This was accomplished by providing two separately energizable elements in the bottom of the vessel so that by moving a switch either of the elements could be selected for energization. This kettle functioned to provide heated water in a very short time with vigorous boiling on the "fast boil" setting or if the kettle was set on the lower heat setting the kettle would evaporate the water in the vessel at a safe rate to perform the function of a vapourizer. The inclusion of a switch and a low heat element have functioned to add heat to the water in the vessel at two widely differing rates. Because of the inclusion of the two additional components required to give the "low heat" operation, substantial additional manufacturing costs were incurred during the manufacture of kettles of this type.

SUMMARY OF THE INVENTION

The kettle of the present invention overcomes the serious cost disadvantage of the prior art kettles in which heat at two different specific rates were added to the water in the vessel. By the addition of an adjustable thermostat to the single heating element of this kettle, the rate of energy flow to the heating element may be varied in small increments over a very large range. The result is a kettle which has an infinitely variable temperature operating range and the cost of such an additional feature is minimal.

BRIEF DESCRIPTION OF DRAWINGS

FIG. 1 is an exploded perspective view of the bottom of the kettle which is the subject of this invention;

FIG. 2 is an enlarged view of the thermostat as shown in FIG. 1; and

FIG. 3 is a side view of the thermostat showing the calibration device in particular.

DESCRIPTION OF PREFERRED EMBODIMENT OF INVENTION

Throughout the disclosure reference will be made to a kettle with a variable wattage input. It is understood that the wattage of an electric heating appliance may be varied in a number of ways such as by controlling the amplitude of the current through the heating element by voltage adjustment or impedance adjustment.

It must also be remembered that the wattage of a heating element may also be varied by periodically interrupting the current passing through the element so that the current which has a fixed amplitude is switched "on" and "off" to effectively vary the wattage input to the heating element. Although the wattage input to the heating element is constant during periods when the current flows, if the time period is chosen which is long in comparison to the cycling rate of the thermostat, it will be found that the average wattage input to the element during the chosen period varies according to the ratio of on to off time that current flows to the heating element. It is in this manner that the thermostat of the present invention functions to vary the wattage into the heating element of the kettle.

Referring to FIG. 1 wherein the bottom of the kettle of this invention is shown, it will be seen that the base 10 has been removed from the main body 12. Main body 12 is suitably manufactured from some metal such as copper, aluminum, or steel. The body 12 is fitted with a lid 14 which performs the function of providing a spout and handle for the vessel 12. Lid 14 may be secured to vessel 12 in a number of ways, none of which are related to the present invention.

Vessel 12 is provided with a recess 16 in the lower surface thereof for the housing of thermostat 18 and the terminals 20 and 22 of the heater element.

The heater of the kettle 12 is a sheath-type heater in common use which is formed by surrounding a resistance wire with an electrical insulating medium which is a good heat conductor. The wire and insulation are enclosed in a metallic sheath which may be copper or some other suitable metallic material. The heater is mounted at or on the lower surface of the kettle in such a manner that the two ends of the sheath protrude through the lower surface and are sealed in the metallic vessel by soldering etc. The termianls 20 and 22 are formed at the ends of the resistance heater which are extended slightly beyond the ends of the sheath. Although the description of the sheathed heater and the method of sealing the sheath have been described in some detail, it is understood that this technique is old and as such forms no part of this invention.

Recess 16 is suitably enclosed by base 10 which is held in place by nut 24 on stud 26 which stud is secured to the lower surface of the bottom of vessel 12 by resistance welding, brazing or any other suitable means.

A supply cord 28 is arranged to be connected to the terminal 22 of the heater and to terminal 30 of thermostat 18. Thermostat 18 is supplied with a handle 32 which adjusts the rate of energy flow to the heater in the kettle.

An enlarged view of the thermostat and adjusting means is shown in FIGS. 2 and 3. Thermostat 18 is held in good heat transfer relationship with the bottom of vessel 12 by means of bolt 34 which in this instance is threadably engaged in the bottom surface of vessel 12. The thermostat 18 may be secured to the lower surface in a variety of ways as long as the thermostat is in good heat conducting relationship with the bottom of said vessel. Bolt 34 holds the entire assembly 18 together in compression. At the top of assembly 18 as shown in FIG. 2 is a bracket 36 in which the adjustable control lever 32 is mounted. Actually, lever 32 is press fitted on to cylindrical member 38 which is provided with threaded end 40 at the lower end thereof, the threaded end 40 threadably engages with corresponding threads in member 36. Thus when lever 32 is moved clockwise or counterclockwise so as to rotate member 38, the member 38 will move up or down with respect to member 36. Member 38 is provided with a cylindraceous recess 42 in the lower portion thereof which is of a suitable dimension to accept the long cylindrical insulating member 44 therein.

Member 38 is also provided with post 39 which provides limits for the arc of rotation of member 38. Post 39 engages stop pin 41 or the upturned tang in the end of bracket 36 at the limit of rotation in either direction. Member 44 is received in recess 42 in a good sliding fit, and is arranged to rest against the lower surface 46 of screw 48. Screw 48 is threadably received in member 38 and is provided to calibrate the thermostat so that the position of lever 32 will be in the correct temperature operating range when manufacture is complete.

Below member 36 is an insulating spacer 50 and below this is a conducting terminal 30 which is arranged to be in good electrical conductivity relationship with member 52 of thermostat 18. Member 52 is capable of carrying the rated current of the heating element of the kettle and is held in fixed position in compression by bolt 34. Member 52 is provided with a clearance hole 54 so that member 44 may pass therethrough in an unobstructed manner and a contact 56 is mounted at the lower surface near the end remote from bolt 34.

Spacer 58 separates member 52 from lower members 60 and 62. Member 62 is arranged to be more or less parallel with member 52 and member 62 is provided with a dimple in the top surface thereof to receive the lower end of member 44 therein.

The position of the free end of the member 62 is thus determined by the position of member 44 which in turn translates by rotation either member 38 or 48. Member 62 has a contact 64 which faces upwardly and is arranged to be positioned in working relationship with contact 56 of member 52. Member 60 which is a bus member connected to terminal 20 is arranged to be in good electrical contact with member 62. An insulating spacer 66 separates the bimetal member 68 from the member 62. Member 68 is arranged to be in a more or less parallel relationship with the member 62 and at the same time member 68 must be in good heat conducting relationship with the lower surface of vessel 12. Member 68 is provided with a recess 70 formed therein by having a portion of the material removed therefrom. Recess 70 serves to fixedly receive insulating member 72 therein. Insulating member 72 is provided with post 74 which extends toward member 52.

The thermostat functions as follows. Current from supply cord enters the thermostat on terminal 30 and passes into member 52. Contact 56 on member 52 is in contact with contact 64 of member 62 and current thus passes into member 62 and into bus member 60 to terminal 20 of the heater element. Current then passes from heater element to terminal 22 thence to supply cord 28.

As the heater element heats the water in vessel 12, a small proportion of heat travels into bimetal member 68 to deflect it upwardly. When the temperature of bimetal 68 is elevated sufficiently, bimetal 68 and insulating member 72 move up sufficiently to cause post 74 of member 72 to push member 52 up so as to move contact 56 away from contact 64 on member 62 and thus open the circuit. This point would normally be set to the boiling point of the water in vessel 12. Bimetal member 68 thus moves member 72 up and down in response to the temperature of the bimetal to control the energy flow into the heating element.

The input wattage rate is adjusted by moving the lever 32 so as to rotate member 38 in member 36. This causes member 44 to translate and move member 62 up or down.

If it is desired to change the "boil rate" of the kettle, lever 32 is moved to a higher heat position, member 38 rotates and tends to unthread itself in member 36 thus allowing member 44 to move upwardly, thus allowing member 62 which is spring loaded against member 44 to move upwardly. This causes contacts 56 and 64 to close at a temperature which will be significantly higher than previously, and the rate at which energy is fed into the heater will be increased. If the water in vessel 12 was previously boiling, it will boil more vigorously, thus the rate of evaporation will be increased.

Screw 48, which is a calibration screw, is set at the factory to adjust the position of member 62 so that the lever 36 will be in its proper position in the working range. Screw 48 may be restrained from further movement after calibration by the addition of thermosetting cement around the heat thereof to bind screw 48 in member 38.

It is seen that a kettle has been described which is much more versatile in its operation than prior art models and yet is basically simplistic in concept and manufacture. Because of this, manufacturing problems are lessened and associated service problems are minimized.

The embodiments of the invention in which an exclusive property or privilege is claimed are defined as follows:

1. An electric kettle comprising a covered metallic vessel having a lid sealedly attached thereto, said lid having a handle and spout formed integrally therein, a cavity formed in the lower surface of said vessel for housing a thermostatic device, said vessel having a sheath type heater sealedly mounted in the bottom of said vessel to heat water in said vessel, the ends of said heater passing in a sealed relation through the lower surface of said vessel into said cavity, a power supply cord also being supplied to said cavity, said cavity being covered by an insulating base plate, said power supply cord being connected in a circuit comprising said heater and said thermostatic device, said thermostatic device being mounted in good heat transfer relationship with the lower surface of said vessel so as to sense the temperature of water in said vessel, said thermostatic device having handle means extending through said base plate so as to enable the operating temperature range of said thermostatic device to be conveniently adjusted from the exterior of said base plate.

* * * * *